United States Patent
Battersby

(10) Patent No.: US 6,443,141 B2
(45) Date of Patent: Sep. 3, 2002

(54) METHOD OF MODIFYING THE RELEASE POINTS OF PITCHES FROM A VIDEO PITCHING MACHINE

(76) Inventor: Gregory J. Battersby, 25 Poplar Plain Rd., Westport, CT (US) 06880

( * ) Notice: Subject to any disclaimer, the term of this patent is extended or adjusted under 35 U.S.C. 154(b) by 0 days.

(21) Appl. No.: 09/780,869

(22) Filed: Feb. 9, 2001

Related U.S. Application Data

(63) Continuation-in-part of application No. 09/457,809, filed on Dec. 9, 1999, now Pat. No. 6,186,134, which is a continuation-in-part of application No. 09/259,722, filed on Mar. 1, 1999, now Pat. No. 6,182,649.

(51) Int. Cl.$^7$ .................................................. F41B 4/00

(52) U.S. Cl. ............................................................ 124/78

(58) Field of Search ........................ 124/6, 78; 473/451

(56) References Cited

U.S. PATENT DOCUMENTS

| | | | | | |
|---|---|---|---|---|---|
| 4,442,823 | A | * | 4/1984 | Floyd et al. | 124/78 |
| 5,174,565 | A | * | 12/1992 | Komori | |
| 5,464,208 | A | * | 11/1995 | Pierce | 124/78 X |
| 6,082,350 | A | * | 7/2000 | Crews et al. | 124/78 |

* cited by examiner

Primary Examiner—John A. Ricci
(74) Attorney, Agent, or Firm—Grimes & Battersby, LLP

(57) ABSTRACT

A method of visually changing the release points of pitches from a video pitching machine ball-throwing machine, which comprises the steps of (a) providing a pitching machine which is mounted in close proximity to a projection screen having a fixed opening through which a ball can be thrown from the machine toward a batter; (b) providing a video projector for projecting the video image of a pitcher on the screen; (c) providing a programmable controller for synchronizing the release of the ball from the machine with the video image; and changing the visual release point of the pitcher by adjusting the position of the video image relative to the fixed release point in order to simulate the pitcher throwing from a different release point.

4 Claims, 7 Drawing Sheets

METHOD OF MODIFYING THE RELEASE POINTS OF PITCHES FROM A VIDEO PITCHING MACHINE

RELATED APPLICATIONS

This is a continuation-in-part of U.S. patent application Ser. No. 09/457,809 filed on Dec. 9, 1999, now U.S. Pat. No. 6,186,134, in the name of Gregory J. Battersby, Charles W. Grimes and Steven Van Geldern entitled Pitching System with Video Display Means which, in turn, was a continuation-in-part of U.S. patent application Ser. No. 09/259,722 filed on Mar. 1, 1999, now U.S. Pat. No. 6,182,649, in the name of Gregory J. Battersby, James Cobb, Charles W. Grimes, Richard Schile, and Steven Van Geldern for Ball-throwing Machine.

BACKGROUND OF THE INVENTION

1. Field of the Invention

The present invention relates generally to a method of modifying the release points of pitches from a video pitching machine and, more particularly, to such a method that is adapted to be used in conjunction with a video pitching machine that is adapted to pitch baseballs and softballs and throw tennis and other balls interchangeably to different locations and at different speeds and with different spins, synchronized to work in conjunction with a video display means to permit an individual to visually view an opponent, such as a pitcher, prior to and during delivery of the ball or pitch.

The invention has particular applicability for use with a baseball pitching machine for both professional and amateur athletes in that it realistically recreates a pitching environment whereby a batter faces the image of an actual pitcher, which image is synchronized with the machine to interchangeably deliver a variety of pitches (i.e., fastballs, curveballs, changeups, etc.) at different speeds to different locations, without the need for manually readjusting or repositioning the machine between pitches.

2. Description of the Prior Art

Pitching machines and ball-throwing machines are well-known in the art and generally fall into four categories: (1) machines that employ a spring actuated arm mechanism to propel the ball; (2) machines that employ at least one rotating wheel or a pair of rotating, coacting wheels to propel the ball; (3) machines that rely on pneumatic pressure to propel the ball; and (4) machines that employ converging and diverging rotatable discs to propel the ball.

Examples of ball-throwing machines that employ a spring mechanism to propel the ball are described, for example, in U.S. Pat. No. 3,757,759 which issued on Sep. 11, 1973 to J. G. Haworth for Automatically Varied Oscillation Type Ball Projecting Device and U.S. Pat. No. 4,524,749 which issued on Jun. 25, 1985 to Paul S. Giovagnoli for Spring-Type Ball Pitching Machine. Commercial versions of such a machine have been marketed by Master Pitching Machine of Kansas City, Mo.

In recent years, the majority of the commercially available ball-throwing or pitching machines employ one or two coacting rotating wheels which are used to propel a ball that is introduced into the nip between the rotating wheels or between a plate and a single rotating wheel. Examples of such machines are described in U.S. Pat. No. 3,724,437 which issued on Apr. 3, 1973 to E. W. Halstead for Ball-throwing Machine; U.S. Pat. No. 3,815,567 which issued on Jun. 11, 1974 to Norman S. Serra for Coacting Wheel Ball Projecting Device; U.S. Pat. No. 4,197,827 which issued to Tommy L. Smith on Apr. 15, 1980 for Coacting Wheel Ball Projecting Device; U.S. Pat. No. 4,423,717 which issued to Edward W. Kahelin on Jan. 3, 1984 for Variable Double Wheel Ball Propelling Machine; U.S. Pat. No. 4,583,514 which issued to Fujio Nozato on Apr. 22, 1986 for a Ball-throwing Machine; and U.S. Pat. No. 4,922,885 which issued to Shigery Iwabuchi et al. on May 8, 1990 for a Pitching Machine. Commercial machines that employ a pair of rotating coacting wheels are marketed by The Jugs Company of Tualatin, Oreg., ATEC of Sparks, Nev., AAI American Athletic, Inc. of Jefferson, Iowa, K-Lin Specialties, Inc. of Huntington Beach, Calif. and OMNI Sports Technologies of Kansas City, Mo.

Machines that utilize a pair of coacting wheels are able to deliver a variety of different pitches, e.g., fastball, curve ball, screwball, etc. at a variety of different speeds. Changes in the pitch speed or pitch type are accomplished by varying the speed of the individual wheels and the angle of presentation relative to a horizontal and/or vertical plane. The ability of such machines to deliver different pitches is described, for example, in U.S. Pat. No. 3,288,127 which issued on Nov. 29, 1966 to J. C. Bullock for Baseball Pitching Machine with Ball Curving Device; U.S. Pat. No. 3,604,409 which issued to Ralph W. Doeg on Sep. 14, 1971 for Ball Projecting Machine with Direction Control Mechanism; U.S. Pat. No. 3,724,437 which issued on Apr. 3, 1973 to Earle W. Halstead for Ball-throwing Machine; U.S. Pat. No. 4,323,047 which issued on Apr. 6, 1982 to James K. McIntosh et al. for Automatic Ball Pitching Machine; U.S. Pat. No. 4,372,284 which issued to James A. Shannon et al. on Feb. 8, 1983 for Baseball-Pitching Machine; U.S. Pat. No. 4,655,190 which issued to Clifford V. Harris on Apr. 7, 1987 for Ball Pitching Machine with Selective Adjustment Between Drive and Pressure Wheels.

While rotating wheel machines are capable of varying the speed of the pitch and the type of the pitch, an inherent problem with such machines, however, is that they require extensive adjustments and realignment of the machine in order to change from one pitch to another or from one location to another. For example, if a coach seeks to change the pitch to be delivered by the machine from a 90 MPH fastball to a 75 MPH curve ball or from a fastball in one position in the strike zone to a fastball in another position, the coach must manually readjust the wheel speeds, reposition the angle of the wheels relative to a vertical and/or horizontal plane, and manually realign the horizontal and vertical position of the machine. It can take as long as five minutes to accomplish these changes before the machine is properly re-positioned to be able to deliver the next pitch. As a result, coaches tend to use these machines to deliver a series of the same pitch to the same location rather than attempting to interchangeably deliver different pitches to different locations as a pitcher would do in an actual game. Accordingly, these machines are of only marginal value in attempting to prepare a batter for game conditions. Such machines frequently give the hitter a false sense of security, e.g., believing that because they can hit the same pitch delivered repeatedly at the same speed to the same location they will succeed in actual game conditions.

Others have recognized this problem and incorporated devices in such machines to permit adjustment of both the horizontal and vertical position of such machines. See, for example, U.S. Pat. No. 5,174,565 which issued on Dec. 29, 1992 to Yutaka Komori for Baseball Pitching Machine; U.S. Pat. No. 5,344,137 which issued on Sep. 6, 1994 to Yutaka Komori for Method for Improving the Accuracy of a Baseball Pitching Machine; U.S. Pat. No. 5,359,986 which issued on Nov. 1, 1994 to Earl K. McGrath et al. for Pitching Machine and Method; and U.S. Pat. No. 5,437,261 which issued on Aug. 1, 1995 to Kerry K. Paulson et al. for Ball Pitching Device. While permitting minor adjustments for both horizontal and vertical position to accommodate for slight changes in pitch speed, none of these patents permit rapid changing of pitch type, i.e., fast ball to curve ball, etc. Such change would only be accomplished by a major re-positioning and re-adjusting the rotational velocity of the two coacting wheels.

Attempts have been made to use three coacting rotating wheels in a pitching machine to permit the delivery of different types of pitches without the need for repositioning the machine between pitches. U.S. Pat. No. 5,649,523 which issued on Jul. 22, 1997 to Jack C. Scott for Ball-throwing Apparatus and U.S. Pat. No. 4,442,823 which issued to Johnnie E. Floyd on Apr. 17, 1984 for Ball-throwing Machine and System Having Three Individually Controllable Wheel Speeds and Angles describe two such attempts. The machines described in these patents are not commercial, however, due, in large measure, to their failure to precisely control the horizontal and vertical positioning of the machine. Moreover, they both fail to carefully consider and control the forces of the three coacting wheels on the ball in order to consistently deliver a variety of different pitches with the accuracy and precision required.

Granada Pitching Machines of Central Point, Oregon recently introduced a three-wheel pitching machine that incorporates limited controls over the individual wheel speeds. The machine, known as the Triton G-2000, fails to provide for horizontal and vertical adjustments of the aiming point and, as such, is incapable of delivering a plurality of different pitches at different speeds and locations on an interchangeable basis.

The concept of programming a pitching machine to deliver a variety of different pitches has been discussed in prior patents, most notably in U.S. Pat. No. 5,125,653 which issued to Ferenc Kovacs et al. on Jun. 30, 1992 for Computer Controller Ball-throwing Machine and U.S. Pat. No. 5,464,208 which issued on Nov. 7, 1995 to Richard A. Pierce for Programmable Baseball Pitching. Such machines are of the two-wheel type and are incapable of rapid change in order to interchangeably deliver a variety of different pitches. Accordingly, the degree of programming offered by these devices is minimal, at best.

The marriage of a ball-throwing machine with a video display of a pitcher is described in U.S. Pat. No. 5,195,744 which issued on Mar. 23, 1993 to Neil S. Kapp et al. for Baseball Batting Practice Apparatus with Control Means. Such device, however, fails to offer the unique advantages of delivering a variety of different pitches as contemplated by the present invention. The synchronization means of such device relies upon an audio signal generated by the video, without any regard to the status of the ball in the queued position. Furthermore, the ball queuing system of this device relies on gravity and is imprecise and subject to failure.

In game-like conditions, pitchers will often change arm angles and pitch from different release points in order to confuse batters. For example, many overhand pitchers will occasionally deliver a side-arm pitch to give the hitter a different look. Heretofore, the problem with pitching machines is that they deliver the same pitch from the same release point which is unlike actual game-like conditions.

One attempt at addressing this issue was described in U.S. Pat. No. 6,082,350 which issued on Jul. 4, 2000 to Doug A. Crews et al. for Accurate, Multi-axis Computer Controlled Object Projection Machine which relies on physically moving the machine to achieve multiple release points. This is a very expensive and overly complex attempt to address this problem.

SUMMARY OF THE INVENTION

Against the foregoing background, it is a primary object of the present invention to provide a method of modifying the release points of pitches from a video pitching machine.

It is another object of the present invention to provide such a method in which the physical ball release point remains fixed.

It is yet another object of the present invention to provide such a method in which the projected image is adjusted to give the appearance of a different release point.

It is but another object of the present invention to provide such a method further including the movement of the target to adjust any actual ball trajectory.

To the accomplishments of the foregoing objects and advantages, the present invention, in brief summary, comprises a method of visually changing the release points of pitches from a video pitching machine ball-throwing machine. The method comprises the steps of: (a) providing a pitching machine which is mounted in close proximity to a projection screen having a fixed opening through which a ball can be thrown from said machine toward a batter; (b) providing a video projector for projecting the video image of a pitcher on the screen; (c) providing a programmable controller for synchronizing the release of the ball from the machine with the video image; and (d) changing the visual release point of the pitcher by adjusting the position of the video image relative to said fixed release point in order to simulate the pitcher throwing from a different release point.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

BRIEF DESCRIPTION OF THE PREFERRED EMBODIMENTS

Figure 1:
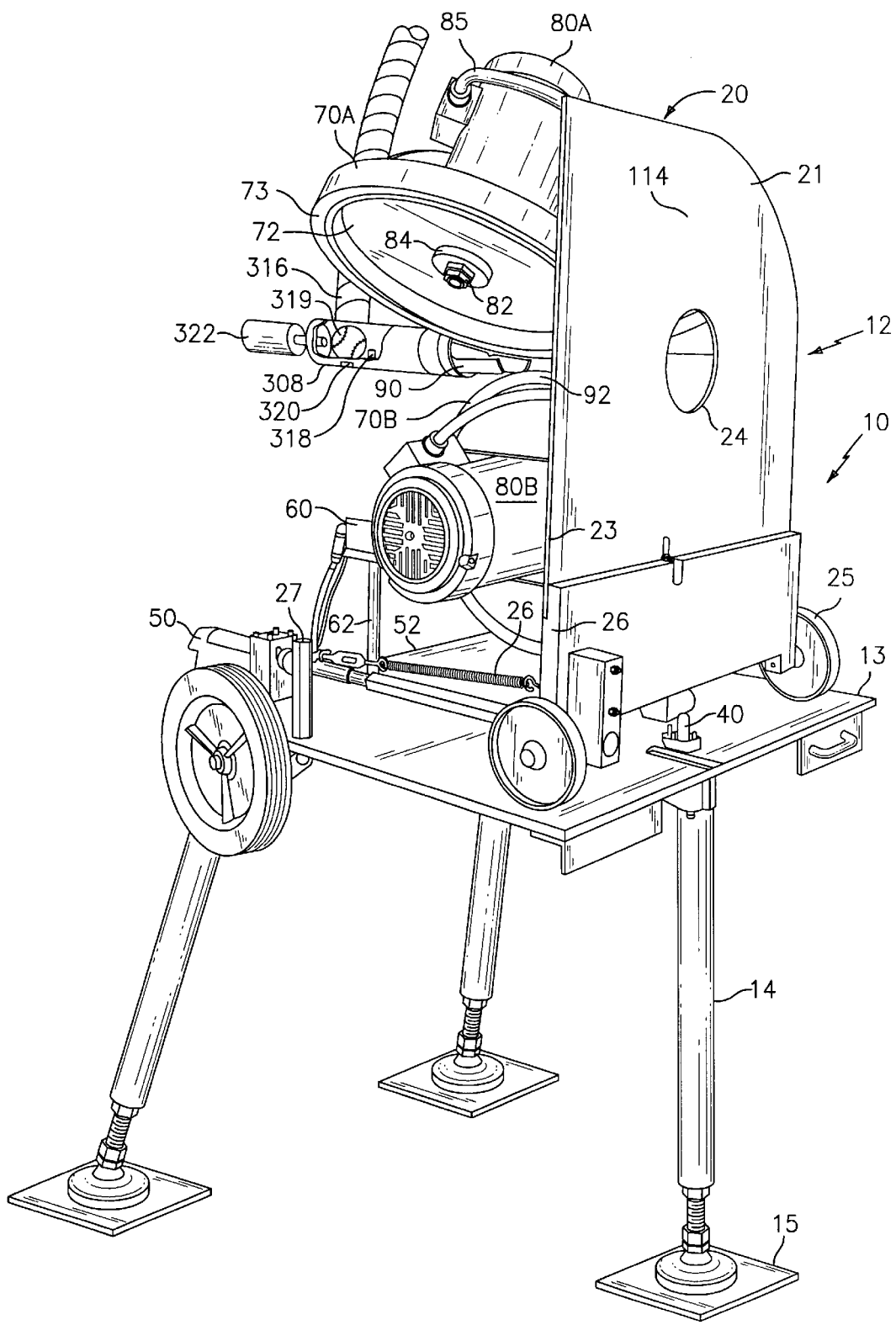
FIG. 1 is a perspective view of the throwing head portion of the pitching system of the present invention.

Referring to the drawings and, in particular, to FIG. 1 thereof, the ball-throwing machine of the present invention is provided and is referred to generally by reference numeral 10. The machine 10 includes an upper portion 12 that is mounted on a base 13 that includes a plurality of removable legs 14 to form a tripod. A shock-absorbing device such as a shock absorber (not shown) may be included in the rear legs to minimize the impact of any recoil of the machine 10 during use.

An enlarged foot 15 is provided at the outbound end of each leg 14 and is threadably secured to the leg 14 that permits the length of each leg 14 to be increased and decreased. A flat, rubberized plate may be included at the bottom of each foot 15 to provide additional stability for the machine 10, particularly when used indoors such as, for example, on a gymnasium floor. Ball-throwing machines experience substantial recoil upon delivery of each pitch and it is important to stabilize the machine and reduce the effect of such recoil in order to provide consistent, accurate, repeatable results.

Referring again to FIG. 1, the upper portion 12 includes a moveable power head 20 having at least two and preferably three coacting drive wheels 70A, 70B and 70C (only 70A and 70B are shown in FIG. 1) which serve to propel a ball introduced into the machine toward a desired location. It should be appreciated that the use of three coacting wheels permits the ball-throwing machine of the present invention to interchangeably deliver a variety of different pitches without the need for resetting the angle of the power head as is required in other machines such as, for example, the JUGS machine. In such a three-wheel design, two wheels serve as the drive wheels while the third wheel serves to impart spin on the ball as it passes in the nip 92 between the coacting wheels 70A–70C.

The ball-throwing machine 10 of the present invention may be used to propel baseballs, softballs, tennis balls, lacrosse balls, and the like depending upon the size of the nip 92 between the coacting wheels 70A–70C.

In a preferred embodiment as illustrated in FIG. 1, the three coacting wheels 70A–70C are positioned at equal distances and angles (120 degrees apart) relative to one another. Thus, in the configuration shown in this Figure, the wheels 70A–70C are positioned at the 10 o'clock, 2 o'clock and 6 o'clock positions. When so configured, when the user wants to throw a fast ball, the 10 o'clock and 2 o'clock wheels are set at the same speed while the bottom or 6 o'clock wheel is set at a higher speed so as to create backspin on the ball. This results in a rising fastball. Similarly, a changeup can be created by proportionally slowing the speed of the three wheels 70A–70C.

A sinking fast ball or "split finger fastball" can be created by decelerating the speed of the 6 o'clock wheel relative to the drive wheels. This creates a topspin on the ball which causes the pitch to "sink."

The ball-throwing machine 10 is capable of throwing a curve ball by controlling the speed differential of all three drive wheels. By increasing the speed of the 2 o'clock wheel and decreasing the speed of the 10 o'clock wheel relative to the speed of the 6 o'clock wheel, a rotational spin is imparted to the ball which causes it to break in a down and out direction thus simulating an actual curve ball. The amount of break of the pitch can be adjusted by increasing or decreasing the speed differential of the 2 o'clock and 10 o'clock wheels. Similarly, a slider or fast curve ball can be thrown by increasing the speed of all three of the drive wheels.

A screwball is achieved by decreasing the speed of the 2 o'clock and increasing the speed of the 10 o'clock wheel relative to the speed of the 6 o'clock wheel, causing the ball to rotate and break in a down and in direction.

A knuckleball can be thrown by setting each wheel at the same speed. This causes the ball to be propelled from the machine 10 with virtually no spin, thus creating a typical knuckleball. It should be appreciated, however, that the ability to control the delivery location of a knuckleball thrown by the machine is as difficult as the ability to control a knuckleball thrown by a live pitcher.

The upper portion 12 of the machine 10 is pivotally mounted to a base plate 30 at a center ball joint 40. The power head 20 is comprised of a front plate 21 and a rear plate (not shown), which are attached to one another by three motor mounts (not shown) that extend between the front plate 21 and the rear plate. An aperture 24 is provided in the approximate center of the front plate 21 of the power head 20 through which a ball will be propelled from the machine 10.

It should be noted that the motor mounts are secured to the front plate 21 and the rear plate by a series of bolts which pass through the front plate 21 and the rear plate. This permits the actual position of the motor mounts and the wheels 70A–C which are mounted thereon to be adjusted to accommodate different sized balls, e.g., baseballs, softballs, lacrosse balls, tennis balls, etc. depending upon their position.

The power head 20 is further supported by a pair of pivot wheels 25 that are provided at the opposite sides of the front plate 21 and which permit the power head 20 to rotate in a horizontal direction on the base plate 30.

The power head 20 is adapted to pivot in a horizontal plane about the center ball joint 40 in order to change the horizontal position of the power head 20 relative to a center position and, therefore, the angle at which a ball is delivered to a batter. Actual movement of the power head 20 in a horizontal plane is effected by a horizontal linear actuator 50 which is provided on the upper surface of the base plate 30. Horizontal linear actuator 50 includes a horizontally extending shaft 52 which extends from the horizontal linear actuator 50 to the inside surface of the front plate 21. The horizontal linear actuator 50 serves to cause the power head to pivot in a horizontal direction about the front center ball joint 40.

A spring 26 holds the power head against the linear actuator 50 removing backlash from the linear actuator internal mechanism, thereby increasing the accuracy of the horizontal alignment of the power head 20. Spring 26 is secured between a post 27 that extends upwardly from the base plate 30 and the inside surface of the front plate 21.

The power head 20 is further adapted to pivot in the vertical plane about an axis defined by the center ball joint 40 and the wheels 25, in order to change the vertical angle of the power head 20 relative to the base plate 30 and, therefore, the vertical angle at which a ball is delivered to a batter. A vertical linear actuator 60 having a downwardly extending shaft 62 is provided on the outer surface of the rear plate 22. The vertical linear actuator 60 permits the power head 20 to pivot in the vertical plane about the front center ball joint 40.

It should be appreciated that the ability to move the power head 20 in both a horizontal and vertical direction is critical not only to be able to throw pitches to different locations in the strike zone but, more importantly, to permit it to throw breaking pitches as well as pitches of differing speeds. Any ball-throwing machine that is intended to deliver interchangeable pitches of differing types must be able to be repositioned in the horizontal and vertical planes of the power head on a pitch-by-pitch basis.

The power head 20 is thus able to be repositioned in both a vertical and horizontal planes by the use of horizontal and vertical linear actuators. By extending or retracting the shaft 52 or 62 of such actuators 50 and 60, respectively, the power head 20 is moved in such directions by pivoting about the center ball joint 40.

For example, when one desires to change from a fastball to a changeup (where the speed of the pitch is decreased by at least 10 MPH), the trajectory angle of the pitch must be raised to overcome the effect of gravity on the slower pitch. To accomplish this, the power head 20 is pivoted about the center pivot 40 such that the angle of the pitch trajectory is raised to accommodate the effect of gravity on the pitch. This is accomplished by retracting the shaft 62 of the vertical actuator 60, thereby tilting the power head 20 in an upward direction.

Similarly, the power head 20 may be repositioned to throw a curve ball as follows. The shaft 62 of the vertical linear actuator 60 is retracted so as to cause the angle of trajectory of the pitch to rise while also changing the horizontal position of the power head 20 by retracting the shaft 52 of the horizontal linear actuator 50 causing the power head to point to the side of the plate away from the break.

By pivoting the power head 20 both horizontally and vertically about the center ball joint 40 located at the front of the machine 10, the actual movement of the machine in either or both a horizontal or vertical direction is minimized and, as such, is imperceptible to a batter. Such imperceptibility would be improved if both pivot axes passed through the aperture 24 in the front plate 20.

Control cables (not shown) connect the horizontal and vertical linear actuators 50 and 60 to remote actuator controls contained in a remote control cabinet (not shown) which can be mounted remotely or on the bottom of the base plate 30.

As shown in FIG. 1, the three coacting drive wheels 70A, 70B and 70C of the ball-throwing machine 10 each include a solid hub 72, preferably composed of aluminum, steel or composite material and an outer coating 73 of a deformable material having a relatively high coefficient of friction so as to permit the wheels 70A–70C to sufficiently grip a ball with a minimum of slip in order to propel it toward a batter. Preferred materials for this outer coating include urethane, nitrite rubber and butyl rubber and a preferred hardness for the material is between 25 and 60 Durometer A with a particularly preferred hardness between 40 and 50 Durometer A. While softer materials provide greater conformity to the balls being propelled and allow the machine to be used with a wider variety of balls, such materials have been found to lack the durability required for a commercial product. Moreover, materials having a hardness above 60 Durometer A typically cause a greater slippage of the balls during use which result in decreased machine accuracy.

While the diameter of the coacting wheels 70A–70C can be between eight and 20 inches, a diameter of between 12 and 16 inches is preferred. Wheels having a diameter of approximately 16 inches are particularly preferred. It has been found that larger wheels reduce slippage between the wheels and the balls, thereby increasing the accuracy of the machine. Similarly, larger wheels are advisable when attempting to achieve ultimate ball speeds greater than 90 MPH. Due to the speeds at which these wheels rotate, i.e., up to about 3500 RPM, it is preferable that the hubs be solid and balanced to minimize vibration.

The coacting wheels 70A–70C are each powered by drive motors 80 which are attached to the wheels by motor shafts 82 which extend through the motor mounts 23 and are secured to the wheels 70A–70C by "Tran torque" expanding bushings 84 or B-locks. While drive motors 80 can be virtually any DC or AC motor with sufficient power to rotate the wheels 70A–70C at the desired speeds, one of the essential elements of this machine 10 is the ability to rapidly accelerate and decelerate the coacting wheels 70A–70C to permit the machine to interchangeably deliver a variety of different pitches in a relatively short period of time, i.e., less than 7–10 seconds. There are situations where it is necessary to rapidly accelerate a wheel from, for example, 1200 RPM to 2500 RPM while, simultaneously decelerating another wheel from 2500 RPM to 1500 RPM.

The ability to rapidly accelerate and decelerate the speed of these wheels 70A–70C accurately coming to the new speed is a critical feature of this invention. The DC motors heretofore used by other ball-throwing machines were found to be incapable of achieving the rapid acceleration and deceleration of the coacting wheels required for such a machine. For example, one of the stated objectives of this ball-throwing machine is to be able to deliver different pitches within a 7–10 second time period to simulate actual batting practice conditions with live pitchers. This, of course, requires rapidly accelerating and decelerating certain wheels within this limited period to be able to deliver these different pitches.

It has been determined that such rapid and accurate acceleration and deceleration of the wheels can be easily achieved by the use of AC motors with companion motor drives including dynamic or regenerative braking circuits. Particularly good results have been achieved using a three phase, AC motor that is capable of providing at least ¾ HP. A particularly preferred AC motor is the 1 HP motor marketed by Baldor as model number VM 3116.

The drive motors 80 are each connected to remote variable speed AC motor drives in control box (not shown) by cables 85. It is important that these AC motor drives include a dynamic or regenerative braking circuit to permit rapid deceleration of the coacting wheels 70A–70C in order to allow the rapid interchangeability of pitches. A particularly preferred AC motor drive is the AC Tech MC1000 Variable Frequency Drive marketed by AC Technology Corporation of Uxbridge, Mass. which includes a dynamic or regenerative braking circuit to permit rapid deceleration of the motor and wheel.

Ball introduction tube 90 shown in FIG. 1 is provided for introducing a ball into the ball-throwing machine 10 into the nip 92 formed between the coacting wheels 70A–70C. It will be appreciated that the ball-throwing machine 10 of the present invention may be operated either manually with a coach or other individual hand feeding balls to the machine or, alternatively, the machine 10 may be used in combination with a conventional automatic remote ball feeder of the type commonly used in conjunction with the JUGS and ATEC machines for automatically introducing balls into the machine 10 between the coacting wheels 70A–70C. It will be appreciated, however, that such automatic ball feeders must be modified to work in conjunction with the ball-throwing machine 10 of the present invention due to the movement of the power head 20. In this regard, it is necessary to provide for a flexible, preferably transparent connection between the ball feeder and the power head 20 to accommodate the movement of the power head 20. In either event, however, a ball is introduced into the nip 92 between the coacting wheels 70A–70C for propulsion through the machine 10. The 319 ball is fed from external feeder means (not shown) to a staging or queque area 308 in advance of the nip 92 by flexible feeder tube 316 where it is maintained until it is ready to be introduced into the nip 92. A solenoid 322 is provided that is electrically connected to the control box and is adapted to actuate or "fire" upon receipt of a signal from the control box so as to drive the ball 319 into the nip 92 where it will engage with the drive wheels 70.

The ball-throwing machine 10 of the present invention is controlled by a programmable control unit including a microprocessor that is housed in a separate control box (not shown). The control unit is electrically connected to and provides the controls for the ball-throwing machine 10 of the present invention and is described in greater detail in U.S. Pat. No. 6,186,134, the disclosure of which is hereby incorporated herein by reference thereto.

Specific pitches and sequences of pitches can be-programmed into the controller using a computer. To facilitate the re-programming of the machine, a programmable controller can be attached to a remote magnetic strip "smart card" reader. In this manner, a particular pitch sequence can be stored on a smart card which may be read by the smart card reader to immediately re-program the controller and, thereby, change the automatic pitch sequence. This would permit the user to be able to immediately change sequences to simulate a variety of different pitches. Similarly, the smart card can be used to change the profile of a particular pitch, e.g., a 98-MPH fastball for Roger Clemens rather than the "generic" 90-MPH fastball.

Thus, it is possible to develop a series of smart cards that could be used to program the machine 10 to simulate the profile of the actual pitches of a pitcher such as Kevin Brown and the sequence to which he might pitch a particular batter, such as Mike Piazza.

The ball-throwing machine 10 of the present invention can also be used in conjunction with a video display device on which a pitcher is actually depicted winding up and delivering a pitch. This, of course, offers the advantage of permitting a batter to time their swing against simulated live pitching. Video display devices have been used in commercial batting cages. One such device is marketed under the mark Power Alley by the MIR Corporation of Atlanta, Ga. Currently, such a device uses a conventional ball-throwing device to propel tennis balls to the hitter with no spin at speeds of less than 60 MPH.

Figure 2:
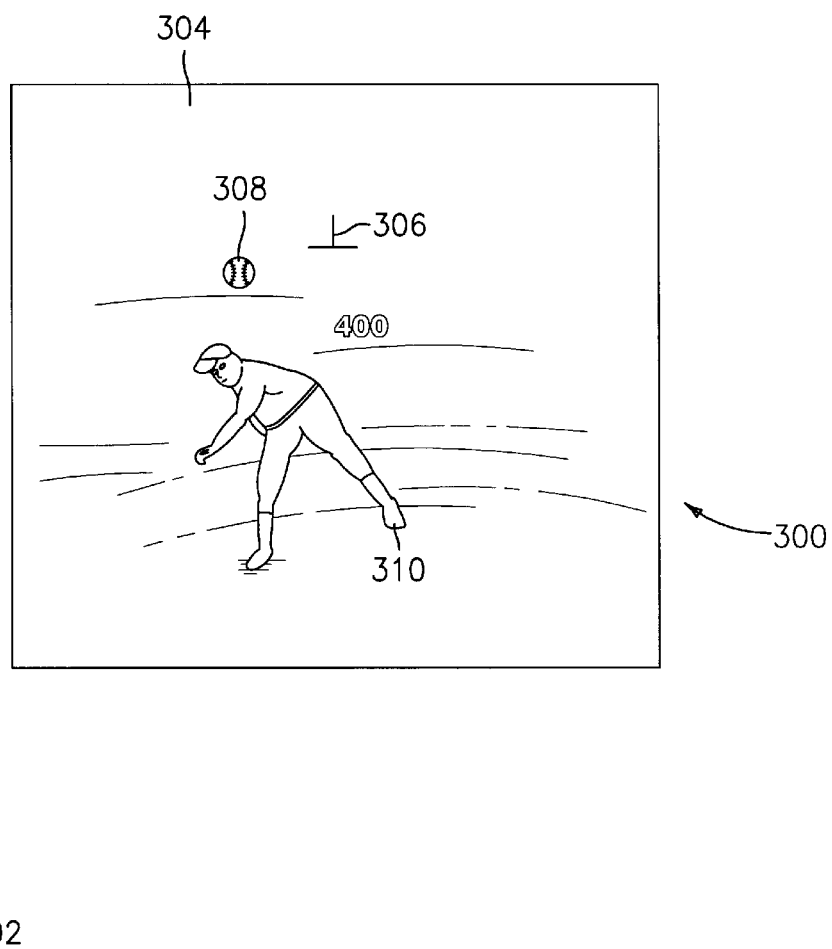
FIG. 2 is a front view of the video projection portion of the pitching system of the present invention illustrating the manner in which a ball is released through the projection screen in synchronization with the video image of the pitcher.
Figure 3:
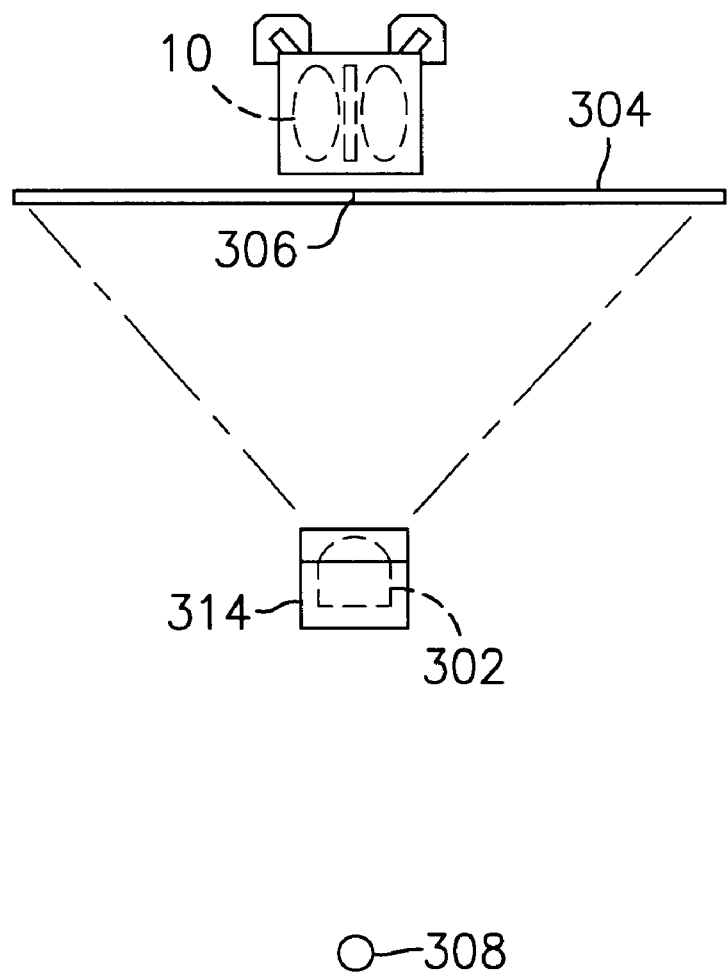
FIG. 3 is a top elevational view of a portion of the pitching system of the present invention illustrating the layout of the various components of the pitching system.
Figure 3:
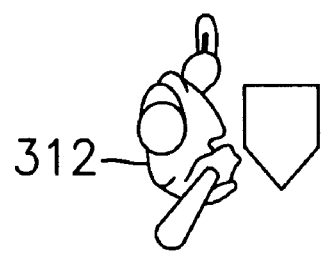
Figure 4:
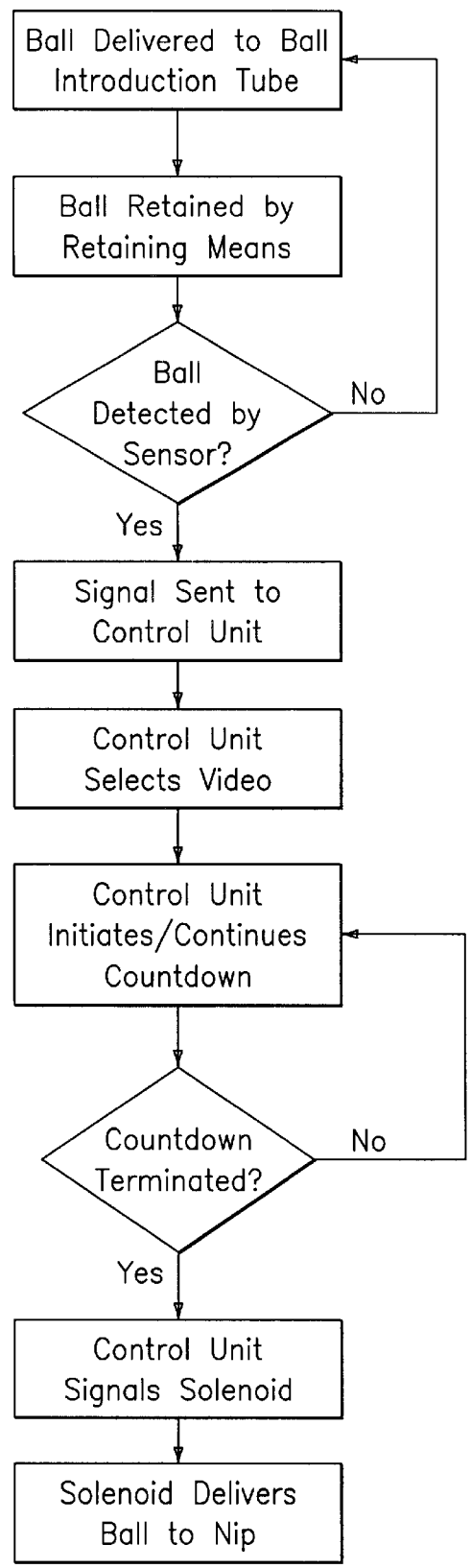
FIG. 4 is a block diagram illustrating the sequence of timing the video image to the release of a ball through the projection screen.

Referring generally to FIGS. 2–4 such a ball-throwing machine 10 configured with a video display means, referred to generally by reference number 300, is shown. The components of such configuration include the ball-throwing machine 10, a video projection or display means 302 and a screen 304 having an opening 306 therein to allow passage of ball 308.

The video display means 302 may be any video device capable of projecting a video image 310 upon a screen 304. Examples of such video display means 302 include a combination or a laser disc player or digital video disc player of the kind manufactured by Sony and Panasonic and a projector, preferably an LCD projector of the type manufactured by Sanyo or NEC. As shall be demonstrated, digital display means are preferred, since such means allow for almost instantaneous access of a variety of video images 310 stored on the storage medium, as well as precise timing of the duration of the video image 310. Alternatively, the video images can be stored as an MPEG2 file on the hard drive of a computer.

The screen 304 is situated between the ball-throwing machine 10 and a batter 312 at the opposite end of the tunnel. The screen 304 may, in theory, consist of any flat surface capable of displaying video image 310. Rigid materials are generally not preferred, because of the large size of the opening 306 that would be required to allow for passage of the ball 308 from all possible vertical and horizontal positions of the ball-throwing machine 10. Flexible screens 304 are therefore preferred, particularly when ease of transportation and installation are considered. However, a limitation of flexible screens 304 is that they are often fragile or easily torn—a significant problem considering balls 308 are often hit back to the screen 304. Therefore, a durable, yet flexible screen 304, such as a vinyl coated polyester screen 304, is preferred.

As discussed, the opening 306 in the screen 304 must be large enough to allow for passage of the ball 308 from all possible vertical and horizontal positions of the ball-throwing machine 10. It has been found that a vertical slit in the screen 304 that intersects with a horizontal slit in the shape of an inverted "T" allows for clean passage of the ball 308, without disturbing the image 310 projected on the screen 304. However, it should be appreciated that a variety of other sized and shaped openings 306 may function effectively to allow clean passage of the ball 308 through the screen 304. Of primary importance is that there is minimal or no contact between the ball 308 and the screen 304, which contact might impart a spin or otherwise deflect the ball 308 from its intended path.

While the screen 304 must be situated between the ball-throwing machine 10 and the batter 312, the location of the display means 302 is not so limited. The display means 302 may be situated behind the screen 304, in which event it would necessarily be located either above, below or to either side of the ball-throwing machine 10. Although feasible, locating the display means 302 behind the screen 304 is not practical, since the video image 310 is often partially blocked by the ball-throwing machine 10, and the video image 310 is often distorted by the sharp angle of display.

The preferred location of the video display means 302 is therefore between the screen 304 and the batter 312. The primary drawback of such a location is that it places the video display means 302 in the direct path of the balls 308 hit by the batter 312. Accordingly, a protective cover 314 is provided so as to deflect the balls 308 and protect the delicate components of the video display means 302.

The delivery of the ball 308 is synchronized with the video image 310 by the control unit 200 so as to create the impression that the image in the video image 310 is actually releasing the ball 308. FIG. 1 shows the mechanisms that allow the control unit 200 to synchronize the ball-throwing machine 10 and video display means 302 so precisely. It should be appreciated that the rear plate 22 has been removed from the drawing so as to facilitate the display of these mechanisms.

The ball 308 is delivered to the ball introduction tube 90 by means of feeder tube 316. Given the rotation as well as the horizontal and vertical movements of ball-throwing machine 10, feeder tube 316 is preferably flexible so as to allow for the changes in location of the ball introduction tube 90.

The ball 308 is retained in a ready position 317 by a retaining means 318. Ball retaining means may be as simple as a slight concavity in the ball introduction tube 90 in which the ball 308 rests, or may be either a rigid or flexible device that acts to "fence" the ball 308 in it's ready position. Adjacent to the ready position 317 is a ball sensor 320 adapted to sense when a ball 308 has been deposited at the ready position 317 of the ball introduction tube 90 by the feeder tube 316.

FIG. 4 is a flow chart showing the operation of the ball-throwing machine 10 in conjunction with the video display means 302. The ball 308 is delivered to the ball introduction tube 90 by means of a feeder tube 316. Once in the ball introduction tube 90, the ball 308 is retained and prevented from entering the nip 92 by means of ball retaining means 318. When the ball 308 is detected by the ball sensor 320, a signal is sent by the ball sensor 320 to the control unit which chooses an appropriate video image 310 for the type of pitch being thrown, and instructs the video display means 302 to play the chosen video image 310. For example, if the pitch to be thrown is a curve-ball thrown by a left-handed pitcher, the control unit will select the video image of a left-handed pitcher throwing a curve ball. Immediately upon commencement of the video image 310 playback, the control unit initiates a countdown for the duration of time between the commencement of the video image 310 and the precise moment in which the ball 308 appears to be released by the video image 310. This duration of time is precisely determined and is the same for every individual video image 310. In the preferred embodiment, this duration is between 5 and 7 seconds, although it should be appreciated that shorter or longer durations may be preferred, either for more rapid operation or for a longer view of the pitcher in his motions.

Upon the termination of the countdown, at which time the pitcher in the video image 310 appears to be about to release the ball 308, the control unit 200 sends a signal to a solenoid 322 located immediately behind the ball 308. This signal instructs the solenoid to impel the ball 308 forward through the introduction tube 90 and into the nip 92, where the ball 308 is engaged by coacting wheels 70A–70C and further impelled through the opening 306 in the screen 304, such that it appears the pitcher in the video image 310 had actually thrown the ball 308.

In actual game-like conditions, pitchers are known to change their release points in an effort to confuse hitters. For example, a pitcher might thrown a majority of his pitches from a full "over the top" release and periodically drop to the side to occasionally thrown a side arm pitch. Similarly, different pitchers thrown from different release points and left handed pitchers obviously throw from different release points that right handed pitchers.

As is obvious from the description of the present invention, the pitching system 12 is not designed to change release points as it would require a change in the physical position of the throwing head. It must be appreciated that when throwing 100 MPH pitches, there is a significant recoil in the machine and the throwing head is constructed in such a manner as to absorb this recoil and prevent movement of the machine. Rigidity and stability of the pitching head is one factor in minimizing the impact of the recoil on the pitches. Providing for a throwing head that moves to multiple positions to change release points poses an engineering challenge to provide the stability and rigidity required to maintain accuracy while permitting movement to different release points. A further problem facing the designer is that movement of the machine frequently takes time and the target time between pitches must be less than 10 seconds for the system to be a viable commercial product.

It has been determined that the impact of a pitcher changing release points is more visual than mechanical. At a distance of 60 feet, six inches between pitcher and batter, the impact of a two foot change in release point on the ball trajectory is less than 3 degrees. The visual image of a pitcher coming around the side from third base, however, has a much greater impact on the batter than the actual trajectory of the ball.

Figure 5A:
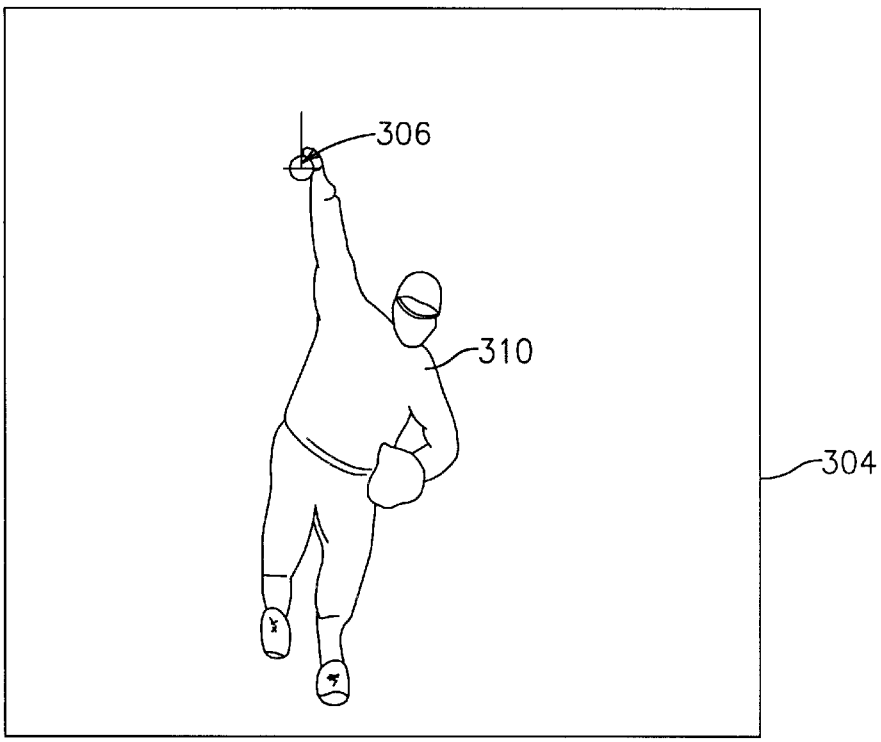
FIGS. 5A, 5B and 5C are front views of the projection screen of the present invention illustrating the manner in which the video image can be moved around on the projection screen to simulate the release of a right-hand pitcher throwing from an overhand release point, a three-quarters arm release point and a side arm release point.
Figure 5B:
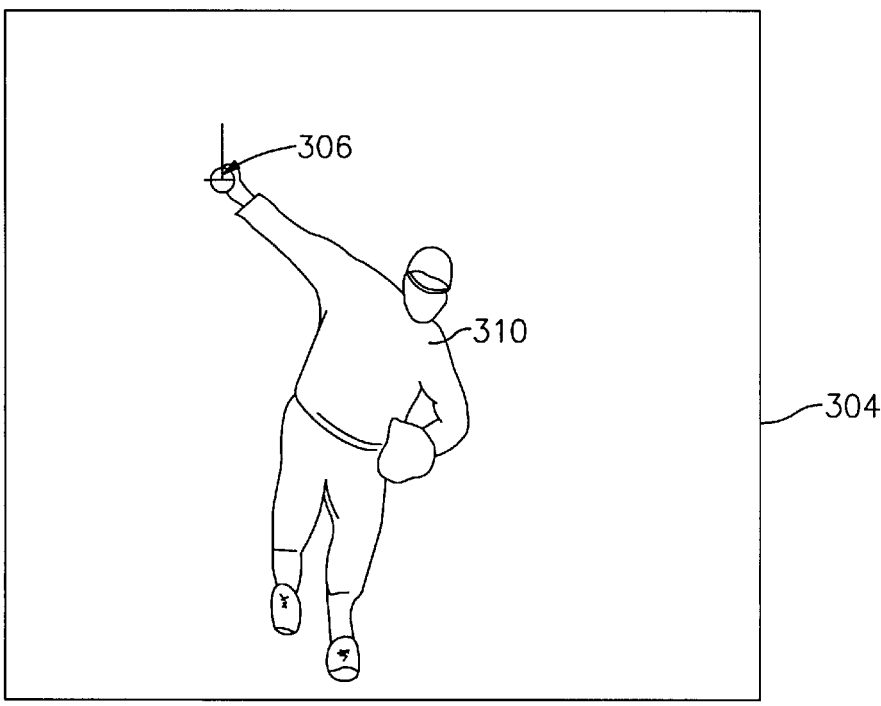
Figure 5C:
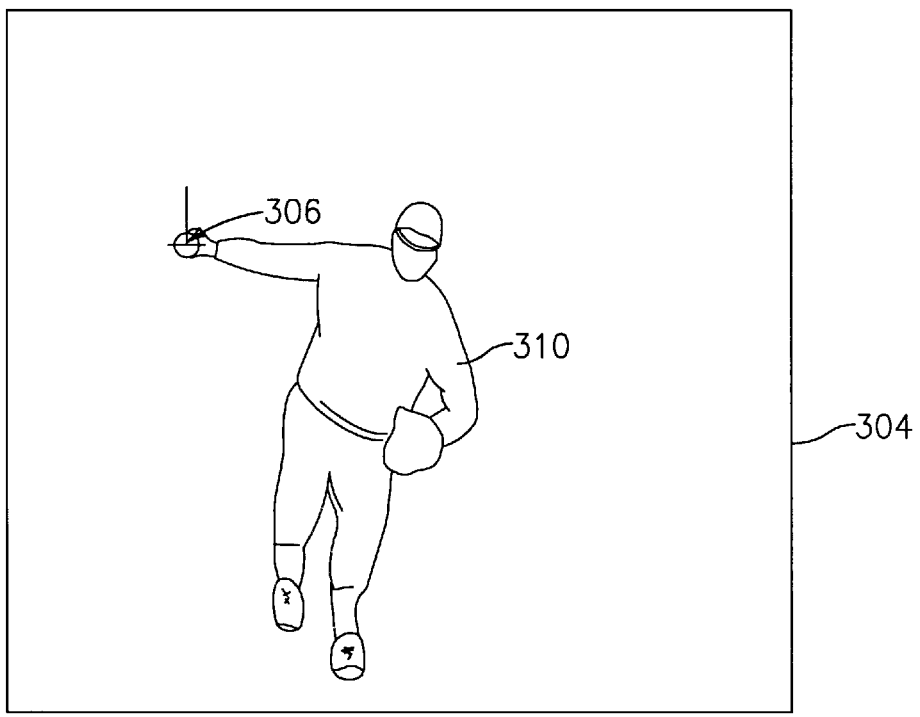

Thus, we have found that by simply adjusting the video image about a fixed release point, one can achieve the same visual impact on the hitter as actually moving the image from different release points. FIGS. 5A–C illustrate the manner in which the image of right handed pitcher 310 can be moved around a fixed ball release point 306 on a projection screen 304 to provide a visual image of a pitcher throwing from a full overhand position (FIG. 5A), a three-quarter arm position (FIG. 5B) and a side arm position (FIG. 5C).

Figure 6A:
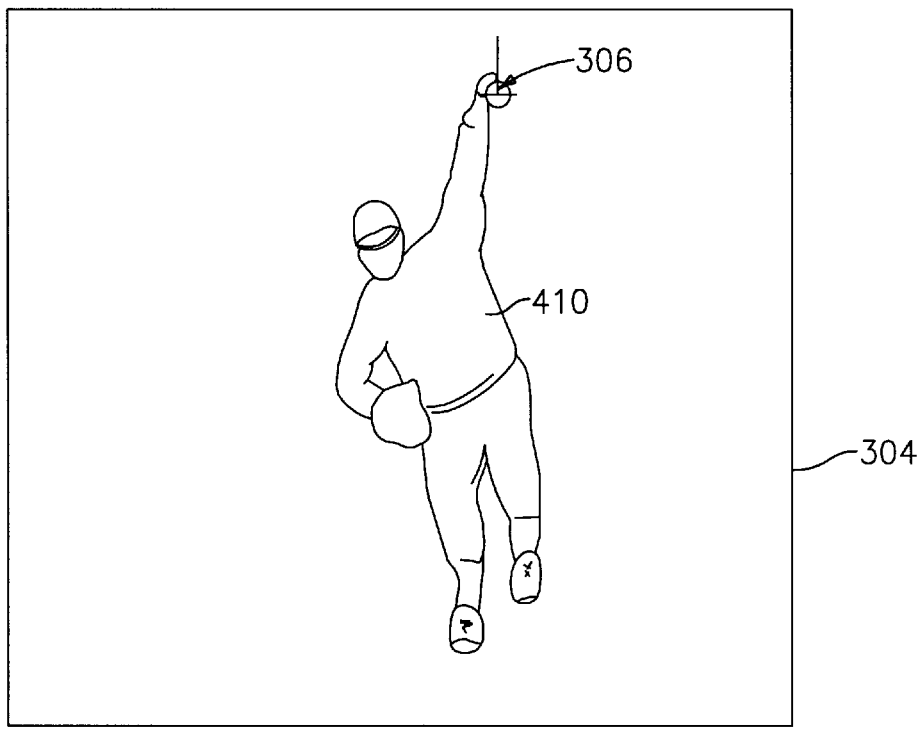
FIGS. 6A, 6B and 6C are front views of the projection screen of the present invention illustrating the manner in which the video image can be moved around on the projection screen to simulate the release of a left-hand pitcher throwing from an overhand release point, a three-quarters arm release point and a side arm release point.
Figure 6B:
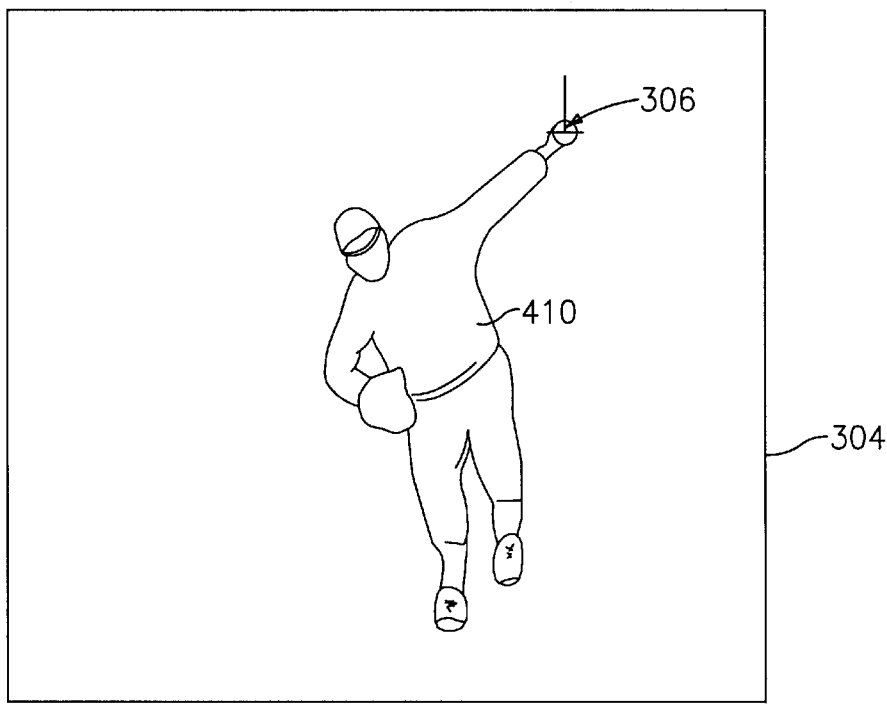
Figure 6C:
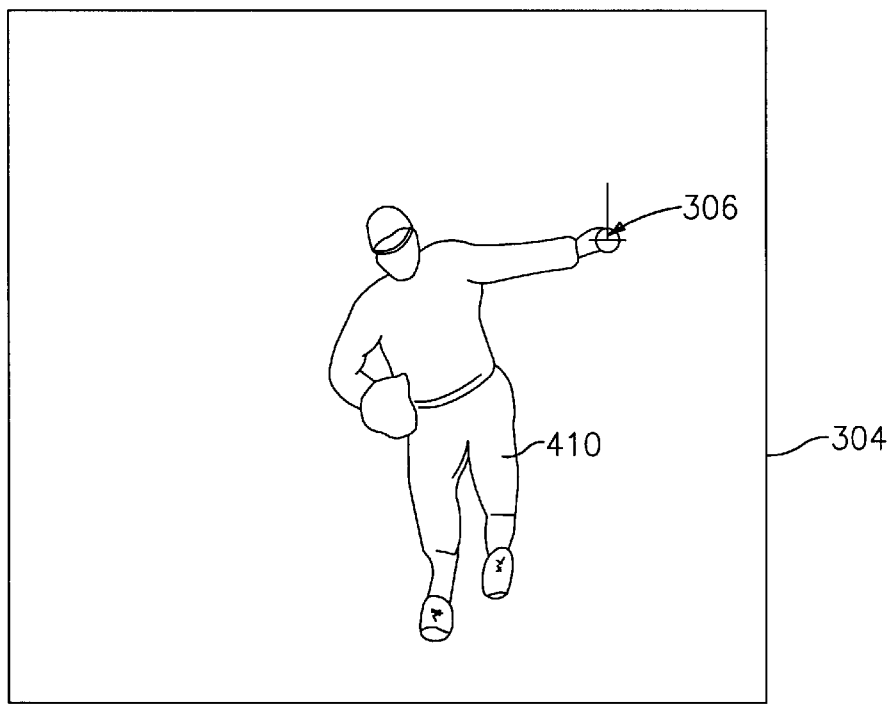

Similarly, FIGS. 6A, 6B and 6C illustrate how the image of a left handed pitcher 410 can be moved around a fixed ball release point 306 on a projection screen 304 to provide a visual image of the pitcher throwing from a full overhand position (FIG. 6A), a three-quarter arm position (FIG. 6B) and a side arm position (FIG. 6C).

The change in the video image can be effected while actually video taping the pitcher and then adjusting the video for display such the hand of the pitcher crosses the fixed release point in each video. As can be seen in FIGS. 5A–C and 6A–C, the video image moves outwardly and upwardly as the release point goes from full overhand to sidearm.

The obvious advantage of this approach is that it provides the batter with the visual image of a pitcher changing release point without having to actually move the position where the ball is actually released. As can be appreciated, one can easily change release points on a pitch by pitch basis without the need for physically moving the machine and, further, since the hole does not move, the hitter can not anticipated changes in the release point since there is no repositioning of the hole through which the ball is released.

In those instances where the hitter wants a truly accurate trajectory of the ball, this can be accomplished by physically moving home plate a distance proportional with the difference in actual release point, e.g., one foot when throwing three-quarter arm and two feet when throwing side arm.

Having thus described the invention with particular reference to the preferred forms thereof, it will be obvious that various changes and modifications can be made therein without departing from the spirit and scope of the present invention as defined by the appended claims.

I claim:

1. A method of visually changing the release points of pitches from a video pitching machine, said method comprising the steps of:

providing a pitching machine which is mounted in close proximity to a projection screen having a fixed opening through which a ball can be thrown from said machine toward a batter;

providing a video projector for projecting the video image of a pitcher on said screen;

providing a programmable controller for synchronizing the release of the ball from said machine with said video image; and changing the visual release point of the pitcher by adjusting the position of the video image relative to said fixed release point in order to simulate the pitcher throwing from a different release point.

2. The method of claim 1 wherein said video image can be adjusted to provide either a right handed pitcher or a left handed pitcher.

3. The method of claim 1, wherein said video image can be adjusted to provide a pitcher throwing a pitch from multiple release points from full overhand to side arm.

4. The method of claim 1, further including the step of moving home plate in proportion to the change in video image to adjust pitch trajectory.

* * * * *